(12) United States Patent
Kishimoto et al.

(10) Patent No.: US 6,517,945 B2
(45) Date of Patent: Feb. 11, 2003

(54) ARTICLE HAVING SILVER LAYER

(75) Inventors: Masaaki Kishimoto, Ibaraki (JP); Junichi Kawashima, Takatsuki (JP); Kenji Hashimoto, Ibaraki (JP)

(73) Assignee: Dainippon Ink and Chemicals, Inc., Tokyo (JP)

(*) Notice: Subject to any disclaimer, the term of this patent is extended or adjusted under 35 U.S.C. 154(b) by 0 days.

(21) Appl. No.: 09/953,549

(22) Filed: Sep. 17, 2001

(65) Prior Publication Data

US 2002/0064664 A1 May 30, 2002

Related U.S. Application Data

(62) Division of application No. 09/462,838, filed as application No. PCT/JP99/02936 on Jun. 2, 1999, now Pat. No. 6,348,533.

(30) Foreign Application Priority Data

Jun. 2, 1998 (JP) ............................................ 10-152751

(51) Int. Cl.$^7$ ................................................ B32B 9/04
(52) U.S. Cl. ........................................ 428/447; 428/450
(58) Field of Search ................................ 428/447, 450

(56) References Cited

U.S. PATENT DOCUMENTS

| | | | | |
|---|---|---|---|---|
| 3,986,997 A | * | 10/1976 | Clark | .................... 260/29.2 M |
| 4,315,970 A | * | 2/1982 | McGee | ........................ 428/412 |
| 4,358,507 A | * | 11/1982 | Senaha et al. | ............... 428/429 |
| 5,527,873 A | | 6/1996 | Kobayashi et al. | |
| 5,753,720 A | | 5/1998 | Nakanishi et al. | |
| 5,822,675 A | * | 10/1998 | Paquet et al. | ................ 428/561 |
| 6,284,385 B1 | * | 9/2001 | Guillaumon et al. | ........ 428/450 |

FOREIGN PATENT DOCUMENTS

| | | |
|---|---|---|
| JP | 53-115627 | 10/1978 |
| JP | 6-79228 | 3/1994 |
| JP | 6-57198 | 9/1994 |
| JP | 7-256817 | 10/1995 |
| JP | 7-310029 | 11/1995 |
| JP | 8-245903 | 9/1996 |
| JP | 9-241532 | 9/1997 |
| JP | 10-158572 | 6/1998 |
| JP | 10-292152 | 11/1998 |
| WO | 99/21661 | * 5/1999 |

* cited by examiner

Primary Examiner—Margaret G. Moore
(74) Attorney, Agent, or Firm—Armstrong, Westerman & Hattori, LLP

(57) ABSTRACT

The present invention relates to an article having a silver layer and a resin composition for a coating material for silver which is used in reflective mirrors of photocopy machines and reflective members for indoor and outdoor lighting appliances, automobile headlights and the like. The article having a silver layer of the present invention has a first cured coating layer (A) comprising a resin having anti-corrosion properties for silver, and adhesiveness for both the substrate and silver or metal comprising mainly silver formed between the substrate and the silver layer (B); and, formed on the silver layer (B), a second cured coating layer (C) comprising a resin selected from the group consisting of a silicone acrylic resin (cl), a silicone alkyd resin (c2), and a multi-functional silicon cross-linked resin (c3) having a main chain formed by siloxane bonds. This type of article having a silver layer is superior in anti-discoloration (anti-corrosion) properties of the silver layer (B). In addition, since the resin composition for coating materials for silver of the present invention contains a multi-functional silicone cross-linked resin (c3) having a main chain formed by siloxane bends, it is superior in heat resistance, there is no yellowing of the coating thereof even when exposed to temperatures around 200° C. and it gives superior anti-discoloration (anti-corrosion) properties to silver.

7 Claims, No Drawings

ARTICLE HAVING SILVER LAYER

This application is a division of prior application Ser. No. 09/462,838 filed Jan. 14 2000, which is a 371 of PCT/JP99/02936, filed Jun. 2, 1992 which is hereby incorporated by reference application Ser. No. 09/462,838 is now U.S. Pat. No. 6,348,533.

TECHNICAL FIELD

The present invention relates to various articles which contain as a main component a part in which a surface is coated with silver such as optically reflective members used in reflecting mirrors of photocopy machines, indoor and outdoor lighting appliance, automobile headlights, and the like, and to resin composition for coating materials for silver. In more detail, the present invention relates to article having a silver layer in which the anti-disclosing (anti-corrosion) properties are remarkably improved, and to resin composition for coating materials for silver with which it is possible to give to the silver a superior anti-discoloring (anti-corrosion) property.

The present applications based on Japanese patent application No. Hei 10-152751 filed in Japan, the content of which is incorporated hereinto by reference.

BACKGROUND ART

Silver ha superior optical properties and electrochemical properties, and has been used as a precious metal from ancient times for decoration, money, eating utensils, electric materials and material for dentistry. In recent times, the use of silver in lighting appliances, photographic industry material for photocopiers and the like liquid crystal displays, semiconductor materials, conductive materials, and aerospace materials has increased rapidly. Silver is used widely as an industrial material.

However, the silver materials which are being put to these uses are extremely unstable chemically, and they react readily with sulfur dioxide gas, hydrogen sulfide, moisture, oxygen and the like in air to generate silver oxide, sulfides of silver, and the like. For this reason, there is the problem that silver surfaces discolor (corrode) to brown or black.

In addition, the discoloration (corrosion) of silver surfaces is further accelerated by high temperature environments, therefore, it has not been possible to use silver in parts such as the reflective mirror of automobile headlights, the temperatures of parts of which exceed 150° C. For this reason, aluminum is used in the reflective mirrors of automobile headlights.

However, silver whose surface has been made smooth is very good as a reflective material of light, and has a reflectivity approximately 10% higher than that of an aluminum surface. In addition, in lighting devices, generally, in order to concentrate the light and to match the polarity of the light, or, in order for equalization of luminous and light diffusion, the light is repeatedly reflected, therefore, the difference between the total reflectance of silver and the total reflective of aluminum is even greater. For this reason, the use of silver which is able to give higher lighting illumination from less electrical energy is desired.

On the other hand, as methods for preventing the discoloration (corrosion) of silver, methods of making alloys of silver with other metals such as copper, platinum, palladium, iridium, zinc, tin, and the like. and methods of applying coating material such as epoxy resin or the like to the surface of the silver are known. However, in the former methods, there are problems with the malleability and ductility of silver becoming reduced, and the external appearance of the surfaces being degraded. With the latter methods, the adhesiveness of the coating material with the surface of the silver is unsatisfactory, and the durability of the coating material is unsatisfactory; therefore, it is difficult to prevent discoloration (corrosion) of the surface of the silver over a long period of time.

For this reason, in order for the silver to sufficiently exhibity superior ductility and malleability and obtain a surface having a glossy appearance, a search for a new type of coating material which has improved adhesiveness for the surface of silver and durability without relying on an alloy treatment became necessary.

The inventors of the present invention carried out careful research for a new type of coating material for protecting the surface of silver which had improved adhesiveness for surface of silver and durability, and made a new invention related to a resin composition which can be used in coating materials. In addition, the present inventors have already presented coating materials having improved adhesiveness for the surface of silver and durability in Japanese Patent Application, First Publication No. Hei 06-57198: Japanese Patent Application, First Publication No. Hei 08-245903; Japanese Patent Application, First Publication No. Hei 09-241532: Japanese Patent Application, First Publication No. Hei 10-185572: and Japanese Patent Application, First Publication No. Hei 10-292152.

However, in high temperature environments, there are still situations in which the surface of the silver becomes discolored (corroded) even when these coating materials are used. Furthermore, in uses in which the surface of the silver is exposed to temperatures of around 200° C. there is the problem that the coating material turns yellow and hinders the reflecting properties of the silver. For this reason, additional effective strategies for increasing the protective properties for silver surfaces are demanded.

As the result of careful research in view of these circumstances, the present inventors discovered that for the prevention of discoloration (corrosion) of a silver layer laminated as a thin layer onto the surface of a substrate, the protection of the contact surface of the silver layer and the substrate is essential, and that protection of only the reflective surface of the silver is inadequate. Furthermore, they discovered that ingenuity is required in the selection of materials for the formation of a protective layer on the substrate side. In addition, the present inventors discovered that it is possible to obtain a resin composition for coating silver which has superior heat resistance and does not turn yellow even when exposed to temperatures of around 200° C. by means of using a multi-functional silicone cross-linked resin having a siloxane component as a main chain.

DISCLOSURE OF INVENTION

In more detail, in the article having a silver layer of the present invention,
  a first cured coating layer (A) comprising a resin composition in which a resin having anti-corrosion properties for silver and adhesives for both a substrate and silver, or a metal comprising silver as a principal component, is formed on the surface of the substrate;
  a silver layer (B) comprising silver or a metal comprising silver as a principal components is formed on this first cured coating layer (A); and
  a second cured coating layer (C) having heat resistance and transparency and comprising a resin composition comprising as a principal component at least one type of resin selected from the group consisting of a silicone acrylic resin (c1), a silicone alkyd resin (c2), and a multi-functional silicone cross-linked resin (c3) formed on the silver layer (B). This multi-functional silicone cross-linked resin (c3) has an average compositional formula represented by general formula 1, a number average molecular weight of 500~1000, and a main chain formed by silicone bonds:

$$R_{11}SiO_{(4-m)/2} \qquad (1)$$

(in the formula, R is a hydrogen atom, a lower alkyl group, a phenyl group, or a substituted phenyl group; and n is a number from 1.2 to 1.4).

By means of above, an article having a silver layer with superior anti-discoloration (anti-corrosion) properties can be obtained.

In addition, it is preferably for the resin which forms the above-mentioned first cured coating layer (A) to be at least one type of resin selected from the group consisting of a silicone acrylic resin (c1), a silicone alkyd resin (c2), and a multi-functional silicone cross-linked resin (c3) having an average compositional formula represented by the above-mentioned general formula 1, a number average molecular weight of 100~1000, and a main china formed by siloxane bonds. Thereby, an article having a silver layer with superior anti-discoloration (anti-corrosion) properties can be obtained.

In addition, it is preferable for the resin which forms the above-mentioned second cured coating layer (C) to be a multi-functional silicone cross-linked resin (c3) having an average compositional formula represented by the above-mentioned general formula 1, a number average molecular weight 500~1000, and a main chain formed by siloxane bonds. Thereby, it is possible to obtained an article having a silver layer in which the second cured coating layer (C) does not turn yellow even when exposed to temperatures of around 200° C.

In addition, the above-mentioned substrate is preferably metal or synthetic resin. Thereby, the article having a silver layer sufficiently exhibits the effects of anti-discoloration (anti-corrosion).

In addition, the above-mentioned silver layer (B) is preferably a thin layer of silver or mainly silver formed by a vacuum deposition method, and ion plating method, or a sputtering method. Thereby, the article having a silver layer sufficiently exhibits the effect of anti-discoloration (anti-corrosion).

In addition, the article having a silver layer of the present invention preferably has a specular glossy surface or reflective surface. Thereby, it is possible to obtain an article having a silver layer suitable for a light reflecting member for a reflecting mirror of a copy machine, indoor or outdoor lighting appliances, and automobile headlights.

In addition, since the article having a silver layer of the present invention sufficiently exhibits the reflectance property of silver, it can be effectively used in reflective mirrors for indoor or outdoor lighting appliances and the reflective mirrors of automobile headlights.

The resin composition for coating materials for silver of the present invention contains a multi-functional silicone cross-linked resin (c3) having an average compositional formula represented by general formula 1, a number average molecular weight of 500~1000, and a main chain formed by siloxane bonds.

$$R_nSiO_{(4-n)/2} \qquad (1)$$

(In the formula, R is a hydrogen atom, a lower alkyl group, a phenyl group, or a substituted pheny group; and n is a number from 1.2 to 1.4. )

Thereby, it is possible to obtain a resin composition for coating materials for silver which has superior heat resistance, gives a superior anti-discoloration (anti-corrosion) property to silver and the film of which does not turn yellow even when exposed to high temperature of around 200° C.

In addition, it is preferable for the resin composition for coating materials for silver of the present invention to additionally contain silver deactivators, in particular, complexes of zirconium with carboxylic acid. Thereby, it is possible to obtain a resin composition for coating materials for silver which reliably gives a superior anti-discoloration (anti-corrosion) property to silver.

In addition, it is preferably for the coated silver to be a thin layer of silver or mainly silver formed by a vacuum deposition method, an ion plating method, or a sputtering method. Thereby, the effect of giving an anti-discoloration (anti-corrosion) property to the silver is sufficiently exhibited.

BEST MODE FOR CARRYING OUT THE INVENTION

In the following, the various selectable constituent features for practicing the present invention and other matters will be explained in detail.

The second cured coating layer (C) of the article having a silver layer of the present invention has heat resistance and transparency and comprises a resin composition comprising as a principal component at least one type of resin selected from the group consisting of a silicone acrylic resin (c1), a silicone alkyd resin (c2), and a multi-functional silicone cross-linked resin (c3) having an average compositional formula represented by general formula 1, a number average molecular weight of 500~1000, and a main chain formed by siloxane bonds. (In the formula, R is a hydrogen atom, a lower alkyl group, a phenyl group, or a subtituted phenyl group: and n is a number from 1.2 to 1.4.)

The silicone acrylic resin (c1) used in the present invention has hydrolyzable silyl groups bonded to the acrylic main chain. As the silicone acrylic resin (c1), those which can be cured by forming a siloxane-acrylic copolymer due to self—cross—linking due to heat or active energy ray can be mentioned.

One of these silicone acrylic resins (c1) can be used independently, or a mixture of two or more of them can be used.

The silicone alkyd resin (c2) used in the present invention is one type of the so-called modified silicone resins in which a silicone resin is modified by an alkyd resin. The silicone alkyd resin (c2) used in the present invention is also called an alkyd resin modified silicone resin and means a resin in which the alkyd resin component and a multi-functional siloxane component (hereinafter simply referred to as silicone component) are copolymerized.

As the alkyd resin component used in the modification, there are types modified by oil or fatty acids; and there are types called oil-free alkyds which have not been modified at all: and either of these types may be used. Oil-free alkyd types also include polyester resin. Any of these can be suitably used.

As the multi-functional siloxane component, silicone resin lower condensates, or monomers such as phenylsiloxiane, methysiloxane, and phenylmethylsiloxane can be used. As the silicone resin lower condensate, phenylmethylsilicone resin lower condensates (phenylmethylpolysiloxane lower condensates) which have many phenyl groups, and which contains functional groups such as methoxy groups, ethoxy groups and hydroxyl groups are suitable; and so called plant-use silicone intermediates or modified-use silicone intermediates can be effectively used. Among these, paint-use silicone intermediates are preferable. As the paint-use silicone intermediates, phenyl alkyl silicone resin lower condensates containing functional groups such as phenyl groups, methoxy groupss, ethoxy groups and hydroxyl groups within the molecule can be mentioned.

This silicone alkyd resin (c2), for example, can be suitably prepared by means of known methods. In addition, as examples of the silicone alkyd resin (c2) whichare commerically avaiable as a pre-made product, polyester resin modified silicone resin, oil-free alkyd resin modified silicone resin, and fatty acid modified alkyd resin modified silicone resin, for example. Beckolite M-6652-60 (manufactured by Dainippon Ink and Chemicals, Inc.) Beckolite M-6650-60 (manufactured by Dainippon Ink and Chemicals, Inc.); Baysilone REsin UD-460M (manufactured by Bayer Ltd.), Baysilone Resin 180 (manufactured by Bayer Ltd.), can be mentioned. As can be seen from the following Embodiments, these are effective from the point of view of practical use, but the silicone alkyd resin (c2) is not limited to these, many others are known and can be appropriately selected and used.

As the a multi-functional silicone cross-linked resin (c3) having a main chain formed by siloxane bonds which is used in the present invention, so called paint-use straight silicone resins can be effectively used.

In addition, multi-functional silicone cross-linked resins comprising phenyl groups, methyl groups, or mixtures thereof in side chains are preferable.

As the a multi-functional silicone cross-linked resin (c3) havinga main chain formed by siloxane bonds which is used in the present invention, those having a number average molecular weight in the range of 600 to 800 are particularly preferable.

When the number average molecular weight of the multi-functional silicone cross-linked resin (c3) having a main chain formed by siloxane bonds is less than 500, the suitability for coating (external appearance) is degraded, and therefore this is undesirable. On the other hand, when the number average molecular weight exceeds 1000, the suitability for coating is degraded, and thermal discoloration becomes extreme, therefore, this is undesirable.

The degree of siloxane cross-linking in the multi-functional silicone cross-linked resin (c3) having a main chain formed by siloxane bonds used in the present invention is expressed by R/Si (the average number of organic groups bonded to a single silicone atom, and corresponds to n) in the general formula (1). A degree of siloxane cross-linking within the range of 1.2 to 1.4 can be suitably used.

When R/Si is less than 1.2, the coating film becomes brittle, and cracks are generated in the coating film due to heat. When R/Si exceeds 1.4, adhesiveness with respect to silver is reduced, the gas barrier property and the like of the coating film are degraded, and it is not possible to prevent yellowing of the coating film due to heat, therefore, this is not desirable.

This multi-functional silicone cross-linked resin (c3) having a main chain formed by siloxane bonds can be suitably produced using known methods, for example.

In more detail, it can be produced by mixing one or more of various chlorosilane compounds, and carrying out hydrolysis followed by condensation.

In addition, as examples of the multi-functional silicone cross-linked resin (c3) having a main chain formed by siloxane bonds which are commercially available as pre-made products, there are straight silicone resin SH 804 and SR 2400 (manufactured by Dow Corning Toray Silicone Co., Ltd.): TSR 144 (manufactured by Toshiba Silicone Co., Ltd.): and KR 311 (Shin-Etsu Chemical Co., Ltd.). As can be seen from the following Examples, these are effective from the point of view of practical use, but the multi-functional silicone cross-linked resin (c3) having a main chain formed by siloxane bonds is not limited to these, many others are known can be appropriately selected and used.

In the present invention, by means of using this type of multi-functional silicone cross-linked resin (c3) having a main chain formed by siloxane bonds, it is possible for the first time to form a reflecting mirror for an automobile head light which can be exposed to high temperatures of 200° C. or greater using silver.

In addition, when these types of heat resistant resin are used in the coating layer, they can be used independently or together, and they can be selected according to requirements for anti-corrosion properties, heat resistance, photo resistance and heat resistance of the substrate.

In more detail, the upper limit for heat resistance is approximately 160° C. (approximately 180° C. for short term use of about 100 hours or less) for the silicone acrylic resin (c1); approximately 180° C. (approximately 200° C. for short term use of about 100 hours or less) for the silicone alkyd resin (c2); and approximately 230° C. for the multi-functional silicone cross-linked resin (c3) having a main chain formed by siloxane bonds.

Each of these resins (c1), (c2), and (c3) has superior adhesiveness for both silver or metals comprising mainly silver and for the substrate, and they are superior in anti-corrosion properties for silver, therefore, they are effective for formation of the first cured coating layer (A) and the second cured coating layer (C). However, there are differences to a certain degree in anti-corrosion properties and heat resistance in these cured coatings, therefore, by selecting and using them based on the required properties for the desired product, those properties can be effectively displayed.

However, in order, anti-corrosion properties is best in the silicone acrylic resin (c1), followed by the silicone alkyd resin (c2), followed by the multi-functional silicone cross-linked resin (c3) having a main chain formed by siloxane bonds.

In addition, the order for photo resistance is that the silicon acrylic resin (c1) is better than the multi-functional silicone cross-linked resin (c3) having a main chain formed by siloxane bonds, which is better than the silicone alkyd resin (c2).

In addition, the baking temperature for the purpose of forming the cured coating of each of the resins is approximately 130° C. for the silicone acrylic resin (c1), approximately 180° C. for the silicone alkyd resin (c2), and approximately 200° C. for the multi-functional silicone cross-linked resin (c3) having a main chain formed by siloxane bonds. Consequently, the selective range is regulated by the heat resistance of the substrate.

In the article having a silver layer of the present invention, at least one resin selected from the group consisting of a silicone acrylic resin (c1), a silicone alkyd resin (c2), and a multi-functional silicone cross-linked resin (c3) having a main chain formed by siloxane bonds is effective as the resin which forms the first cured coating layer (A). From among these, in consideration of adhesiveness for the substrate and anti-corrosion properties of silver or metals comprising mainly silver, the silicon alkyd resin (c2) is the most effective. However, the resin is not particularly limited to these.

Moreover, when the first cured coating layer (A) is absent, it is not possible to obtain sufficient adhesiveness between the silver layer (B) comprising silver or a metal comprising mainly silver and the substrate, or anti-corrosion properties of the silver layer (B); and in addition, when the silver layer (B) is a thin film of silver or mainly silver formed by means of a vacuum deposition method, and ion plating method or a sputtering method, it is not possible to obtain satisfactory mirror surface properties. In addition, even when the second cured coating layer (C) is formed on silver layer (B), it is difficult to prevent corrosion from the rear surface of the silver layer (B). Due to this point as well, the formation of a first cured coating layer (A) is important, and depending on the selection of the materials therefore, the results therefrom are even more remarkable.

For the articles having a silver layer of the present invention, as the method of forming the silver layer (B) comprising silver or mainly silver by deposition, known methods of vacuum deposition methods, ion plating methods, or sputtering methods can be suitably used. Here, the amount of silver within the metal comprising mainly silver which forms the silver layer (B) is not particularly limited. For example, amounts at which the effects of the present invention are particularly displayed are 80% by weight or greater, and at which the effects are even further displayed are 95% by weight or greater.

Next, the resin composition for coating materials or silver of the present invention will be explained. The resin composition for coating materials for silver of the present invention contains a multi-functional silicone cross-linked resin (c3) having a main chain formed by siloxane bonds which has an average compositional formula represented by general formula 1, and a number average molecular weight of 500~1000.

$$R_nSiO_{4-n)/2} \tag{1}$$

(In the formula, R is a hydrogen atom, a lower alkyl group, a phenyl group, or a substituted phenyl group; and n is a number from 1.2 to 1.4.)

As the metal deactivator used in the present invention, for example, complexes of zirconium with lower fatty acids (carboxylic acids) having benzoyl groups substituted with lower alky groups such as a complex of zirconium with 4-methyl-γ-oxo-benzene-butanoic acid; and dicarboxylic acid addition derivatives of mercaptobenzothiazol such as (2-benzothiazorylthio)-succinic acid can be mentioned. These metal deactivators may be used independently or mixtures of two or more of them may be used.

In addition, in accordance with need, known additives such as curing catalysts, solvents, leveling agents, coupling agents, anti-foaming agents, flatting agents. UV absorber, antioxidants, and the like can be added to the resin composition for coating materials for silver of the present invention.

As the curing catalysts used in accordance with need, metallic soaps and metal alcoholates, such as tetra-n-butoxytitanium, and zinc octylate can be mentioned. These curing catalysts may be used independently or mixtures of two or more of them may be used.

As the solvents used in accordance with need, aromatic hydrocarbons such as toluene and xylene; alcohols such as methanol, ethanol, and isopropyl alcohol: esters such as butyl acetate, ethyl cellosolve, methyl cellosolve, cellosolve acetate: and ketones such as methylethylketone, methylisobutylketone and cylohexanone can be mentioned. These solvents may be used independently or mixtures of two or more of them may be used.

As specific examples of the coupling agents used in accordance with need, aluminum type coupling agents, titanate type coupling agents, and silane type coupling agents, such as vinyltris(β-methoxyethoxy)silane, γ-glycidoxyproxytrimethoxysilane, tetra(2,2'-diaryloxymethyl-1-butyl)bis(ditridecyl)phosphite titanate, acetoalkyoxyaluminum, and diisopropylate can be mentioned. These coupling agents may be used independently or mixtures of two or more of them may be used.

As the coating method for the resin composition for coating materials for silver of the present invention, for example, there are flow coater method, spray method, dipping method ant the like, and the method may be appropriately selected in accordance with the shape of the article being coated. A coating thickness of 3 to 30 μm is suitable, but within this range, a thickness of 8 to 15 μm is preferably from the point view of anti-discoloration (anti-corrosion) properties and durability.

As applications for the articles having a silver layer of the present invention, materials for lighting appliances, electrical uses such as photocopy machines, semi-conductor materials, aerospace materials and the like, and general industrial materials can be mentioned. In particular, since the articles of the present invention are superior in anti-discoloration (anti-corrosion) properties, and are able to sufficiently exhibit the light reflecting properties of silver, they are suitable for applications in which even small amounts of discoloration (corrosion) will have a large impact such as in automobile headlights, lighting appliances for indoor and outdoor use in which the thin film of silver is formed into a light reflecting surface using deposition. When the article having a silver layer of the present invention is used as the reflecting mirror in automobile headlights, the illuminance of the automobile headlights is increased by 15% when compared to conventional aluminum. In addition, when the article having a silver layer of the present invention is used as the reflecting mirror in indoor lighting appliances, the illuminance of the indoor lighting appliance is increased 30% to 50% when compared with conventional aluminum.

In addition, the resin composition for coating materials for silver of the present invention can effectively be used in these types of articles.

In addition, when the resin composition for coating materials for silver of the present invention is used on a thin layer of silver, and in particular on a surface of a deposited silver, superior effects are exhibited as mentioned above, and when used on solid silver, the effects of the present invention as a surface coating agent therefor are also remarkably exhibited.

EMBODIMENTS

In the following, the present invention will be explained in greater detail by means of embodiments and comparative embodiments. However, the present invention is not limited to these embodiments. In the following, in all cases, parts indicates parts by weight.

Embodiments 1

A coating agent was prepared by mixing 100 parts of Silacoat SCT-8101 (manufactured by Chisso Corporation)

as the silicone acrylic resin (c1) component. 1.5 parts of a complex of zirconium with 4-methyl-γ-oxo-benzene-butanioc acid (CGCl 1930: manufactured by Ciba Specialty Chemicals K.K.) as the metal deactivator, 40 parts of xylene, 60 parts of isopropyl alcohol, and 50 parts of butyl acetate. Next, a first cured coating layer (A) was formed by applying this coating agent to an aluminum sheet by a spray method to give a coating thickness of 10 μm and then baking it at 130° C. Next, a deposited silver film (silver layer (B)) was formed on the surface of this first cured coating layer (A) using a sputtering method. Then a second cured coating layer (C) was formed by applying the above-mentioned coating agent to the surface of the deposited silver film using a spray method to give a coating thickness of 15 μm and then baking it for 30 minutes at 130° C.

Embodiment 2

With the exception that 100 parts of Silacoat SCT-1101 (manufactured by Chisso Corporation) as the silicone acrylic resin (c1) component, and 10 parts of a complex of zirconium with 4-methyl-β-oxo-benzene-propanoic acid as the metal deactivator were used, a deposited silver film having a cured coating of a first cured coating layer (A) and a second cured coating layer (C) was obtained in the same way as in Embodiment 1. cl Embodiment 3

With the exception that 70 parts of Silacoat SCT-1101 (manufactured by Chisso Corporation) and 30 parts of MS51SG1 (manufactured by Mitsubishi Chemical Corporation) as the silicone acrylic resin (c1) component were used, a deposited silver film having a cured coating of a first cured coating layer (A) and a second cured coating layer (C) was obtained in the same way as in Embodiment 1.

Embodiment 4

A coating agent was prepared by mixing 100 parts of UVHC-8553 (manufactured by Toshiba Silicone Co., Ltd.) as the silicone acrylic resin (c1) component, 3 parts of Irgacure 184 (manufactured by Ciba Specialty Chemicals K.K.) as the reaction initiator, 2 parts of a complex of zirconium with 4-methyl-γ-oxo-benzene-butanoic acid (CGCl 1930: manufactured by Ciba Specialty Chemicals K.K) as the metal deactivator, 50 parts of xylene, 40 parts of n-butanol, and 60 parts of butyl acetate. Next, this coating agent was applied to a nylon-6 sheet by a spray method to give a coating thickness of 8 μm and then it was dried at a temperature of 70° C. for 5 minutes. Then, this was irradiated under atmospheric conditions with ultraviolet radiation using a high-pressure mercury lamp of 120 W/cm, with the lamp at a height of 15 cm and a conveyor speed of 30 m/minute, and thereby a first cured coating layer (A) was formed. Next, a deposited silver film was formed on the surface of this first cured coating layer (A) using a vacuum deposition method. Then, the above-mentioned coating agent was applied to the surface of the deposited silver film using a spray method to give a coating thickness of 12 μm and then it was dried at 70° C. for 5 minutes. Then, this was irradiated under atmospheric conditions with ultraviolet radiation using a high-pressure mercury lamp of 120 W/cm, with the lamp at a height of 15 cm and a conveyor speed of 30 m/minute, and thereby a second cured coating layer (C) was formed.

Embodiment 5

A coating agent was prepared by mixing 100 parts of Beckolite M-6652-60 (manufactured by Dainippon Ink and Chemicals, Inc.) as the silicone alkyd resin (c2) component 50 parts of xylene, 50 parts of butyl acetate, and 5 parts of isopropyl alcohol. Next, the coating agent was applied to a BMC (bulk molding compound) sheet by a spray method to give a coating thickness of 10 μm, then it was baked at a temperature of 200° C. for 30 minutes, and thereby a first cured coating layer (A) was formed. Next, a deposited silver film was formed on this first cured coating layer (A) using a sputtering method. Then, the above-mentioned coating agent was applied to the surface of the deposited silver film using a spray method to give a coating thickness of 10 μm, then it was baked at a temperature of 200° C. for 30 minutes, and thereby a second cured coating layer (C) was formed.

Embodiment 6

With the exception that 100 parts of Beckolite M-6650-60 (manufactured by Dainippon Ink and Chemicals. Inc.) as the silicone alkyd resin (c2) component, 2 parts of tetra-n-butoxytitanium as the curing catalyst, and 5 parts of a complex of zirconium with 4-methyl-β-oxo-benzene-propanoic acid as the metal deactivator were used, a deposited silver film having a cured coated of a first cured coating layer (A) and a second cured coating layer (C) was obtained in the same way as in Embodiment 5.

Embodiment 7

With the exception that 100 parts of Baysilone Resin UD-460M (manufactured Bayer Ltd.) as the silicone alkyd resin (c2) component, 3 parts of zinc octylate as the curing catalyst, and 2 parts of a complex of zirconium with 4-methyl-β-oxo-benzene-butanoic acid (manufactured silver film having a cured coating of a first cured coating layer (A) and a second cured coating layer (C) was obtained in the same way as in Embodiment 5.

Embodiment 8

With the exception that 100 parts of Baysilone Resin 180 (manufactured Bayer Ltd.) as the silicone alkyd resin (c2) component, 3 parts of a complex zinc with 4-methyl-β-oxo-benzene-butanoic acid (manufactured by Ciba Specialty Chemicals K.K.) as the metal deactivator were used, a deposited silver film having a cured coating of a first cured coating layer (A) and a second cured coating layer (C) was obtained in the same way as in Embodiment 5.

Embodiment 9

A coating agent was prepared by mixing 100 parts of SH804 (having a number average molecular weight of 800, and a degree of siloxane cross-linking of 1.3: manufactured by Dow Corning Toray Silicone Co., Ltd.) as the multi-functional silicone cross-linked resin (c3) component having a main chain formed by siloxane bonds, 50 parts of xylene, 50 parts of n-butanol, 50 parts of butyl acetate, and 1 parts of zinc octylate as the curing catalyst.

Next, a first cured coating layer (A) was formed by applying this coating agent to an aluminum sheet by a spray method to give a coating thickness of 12 μm and then baking it at 200° C. for 60 minutes. Next, a deposited silver film was formed on this first cured coating layer (A) using a sputtering method. Then, a second cured coating layer (C) was formed by applying the above-mentioned coating agent to the surface of the deposited silver film using a spray method to give a coating thickness of 15 μm and then baking it at 200° C. for 60 minutes.

Embodiment 10

With the exception that 100 parts of SR2400 (having a number average molecular weight of 700, and a degree of siloxane cross-linking of 1.2; manufactured by Dow Corning Toray Silicone Co., Ltd.) as the multi-functional silicone cross-linked resin (c3) component having a main chain formed by siloxane bonds were used, a deposited silver film having a cured coating of a first cured coating layer (A) and a second cured coating layer (C) was obtained in the same way as in Embodiment 9.

Embodiment 11

With the exception that 100 parts of TSR144 (having a number average molecular weight of 650, and a degree of siloxane cross-linking of 1.3: manufactured by Toshiba silicone (Col., Ltd.) as the multi-functional silicone cross-linked resin (c3) component having a main chain formed by siloxane bonds, 2 parts of tetra-n-butoxytitanium as the curin g catalyst, and 2 parts of a complex of zirconium with 4-γ-oxo-benzene-butanoic acid (manufactured by Ciba Specialty Chemicals K.K.) as the metal deactivator were used, a deposited silver film having a cured coating of a first cured coating layer (A) and a second cured coating layer (C) was obtained in the same way as in Embodiment 9.

Embodiment 12

With the exception that 100 parts of KR311 (having a number average molecular weight of 600, and a degree of siloxane cross-linking of 1.4: manufactured by TShin-Etsu Chemical Co., Ltd.) as the multi-functional silicone cross-linked resin (c3) component having a main chain formed by siloxane bonds were used, a deposited silver film having a cured coating of a first cured coating layer (A) and a second cured coating layer (C) was obtained in the same way as in Embodiment 9.

Embodiment 13

A coating agent was prepared by mixing 100 parts of Silacoat SCT-8101 (manufactured by Chisso Corporation) as the silicone acrylic resin (c1) component, 1.5 parts of a complex of zirconium with 4-methyl-γ-oxo-benzene-butanoic acid (CGCl 1930; manufactured by Ciba Specialty Chemicals K.K.) as the metal deactivator, 40 parts of xylene, 60 parts of isopropyl alcohol, and 50 parts of butyl acetate. Next, a first cured coating layer (A) was formed by applying this coating agent to an aluminum sheet by a spray method to give a coating thickness of 10 μm and then baking it at 140° C. for 30 minutes. Next, a deposited silver film was formed on the surface of this first cured coating layer (A) using a sputtering method.

Then a coating agent was prepared by mixing 100 parts of Beckolite M-6652-60 (manufactured by Dainippon Ink and Chemicals, Inc.) as the silicone alkyd resin (c2) component, 50 parts of xylene, 50 parts of butyl acetate, and 5 parts of isopropyl alcohol. Next, this coating agent was applied to the surface of the deposited silver film by a spray method to give a coating thickness of 10 μm, then it was baked at a temperature of 200° C. for 20 minutes, and thereby a second cured coating layer (C) was formed.

Embodiment 14

With the exception that 70 parts of Silacoat SCT-1101 (manufactured by Chisso Corporation) and 30 parts of MS51SG1 (manufactured by Mitsubishi Chemical Corporation) as the silicone acrylic resin (c1) component were used, a first cured coating layer (A) was formed in the same ways as in Embodiment 1. Next, a deposited silver film was formed on the surface of this first cured coating layer (A) using a sputtering method.

Next, a coating agent was prepared by mixing 100 parts of SH804 (having a number average molecular weight of 900, and a degree of siloxane cross-linking of 1.3; manufactured by Dow Corning Toray Silicone Co., Ltd.) as the multi-functional silicone cross-linked resin (c3) component having a main chain formed by siloxane bonds, 50 parts of xylene, 50 parts of n-butanol, 50 parts of butyl acetate, and 1 part of zinc octylate as the curing catalyst. Next, a second cured coating layer (C) was formed by applying this coating agent to the surface of the deposited silver film by a spray method to give a coating thickness of 15 μm and then baking it at 200° C. for 60 minutes.

Embodiment 15

Then a coating agent was prepared by mixing 100 parts of Beckolite M-6652-60 (manufactured by Dainippon Ink and Chemicals, Inc.) as the silicone alkyd resin (c2) component, 50 parts of xylene, 50 parts of butyl acetate, and 5 parts of isopropyl alcohol. Next, this coating agent was applied to a BMC (bulk molding compound) sheet by a spray method to give a coating thickness of 10 μm, then it was baked at a temperature of 200° C. for 30 minutes, and thereby a second cured coating layer (A) was formed. Next, a deposited silver film was formed on this cured coating layer (A) using a sputtering method.

Next a coating agent was prepared by mixing 100 parts of SR2400 (having a number average molecular weight of 700, and a degree of siloxane cross-linking of 1.2: manufactured by Dow Corning Toray Silicone Co., Ltd.) as a multi-functional silicone cross-linked resin (c3) having a main chain formed by siloxane bonds, 50 parts of xylene, 50 parts of n-butanol, 50 parts of butyl acetate and 1 part of zinc octylate as the curing catalyst. Next, this coating agent was applied to the surface of the deposited silver film using a spray method to give a coating thickness of 15 μm, then it was baked at a temperature of 200° C. for 60 minutes, and thereby a second cured coating layer (C) was formed.

Comparative Embodiment 1

A coating agent was prepared by mixing 100 parts of Acrydic A-801 (manufactured by Dainippon Ink and Chemicals. Inc.) and 23 parts of Sumidur N-75 (manufactured by Sumitomo Chemical Co., Ltd.) as the acrylic urethane resin component, 50 parts of xylene, and 10 parts of butyl acetate. Next, a first cured coating layer was formed by applying this coating agent to an aluminum sheet by a spray method to give a coating thickness of 15 μm and then baking it at 80° C. for 30 minutes. Next, a deposited silver film was formed on the surface of this first cured coating layer using a sputtering method. Then, a second cured coating layer was formed by applying the above-mentioned coating agent to the surface of the deposited silver film using a spray method to give a coating thickness of 15 μm and then baking it at 80° C. for 30 minutes.

Comparative Embodiment 2

With the exception that 100 parts of Beckozol J-524-1M-60 (manufactured by Dainippon Ink and Chemicals, Inc.) and 60 parts of Super Beckamine J-820-60 (manufactured by Dainippon Ink and Chemicals, Inc.) as the alkyd melamine resin component, and 100 parts of xylene were mixed to prepare a coating agent and the baking was conducted at 140° C. for 30 minutes, a deposited silver film having a cured coating of a first cured coating layer and a second cured coating layer was obtained in the same ways as in Comparative Embodiment 1.

Comparative Embodiment 3

With the exception that 100 parts of Fluonate K-705 (manufactured by Dainippon Ink and Chemicals, Inc.) and 40 parts of Super Beckamine L-117-60 (manufactured by Dainippon Ink and Chemicals, Inc.) as the fluorine melamine resin component, and 80 parts of xylene, and 40 parts of butyl acetate were mixed to prepare a coating agent and the baking was conducted at 100° c. for 30 minutes, a deposited silver film having a cured coating of a first cured coating layer and a second cured coating layer was obtained in the same way as in Comparative Embodiment 1.

Comparative Embodiment 4

With the exception that 100 parts of Epikote 1001-75X (manufactured by Dainippon Ink and Chemicals, Inc.) and 60 parts of Tohmide 210 (manufactured by Fuji Kasei Kogyo Co., Ltd.) as the epoxy resin component, and 100 parts of xylene, and 50 parts of cellosoluble acetate were mixed to prepare a coating agent and the baking was conducted at 140° C. for 30 minutes, a deposited silver film having a cured coating of a first cured coating layer and a second cured coating layer was obtained in the same way as in Comparative Embodiment 1.

Comparative Embodiment 5

With the exception that 100 parts of a synthetic product having a number average molecular weight of 1500 and a degree of siloxane cross-linking of 1.4 as a multi-functional silicone cross-linked resin having a main chain formed by siloxane bonds, 50 parts of xylene 50 parts of butyl acetate, and 1 part of zinc octylate as the curing catalyst were mixed to prepare a coating agent and the baking was conducted at 200° C. for 60 minutes, a deposited silver film having a cured coating of a first cured coating layer and a second cured coating layer was obtained in the same way as in Comparative Embodiment 1.

Comparative Embodiment 6

With the exception that 100 parts of a synthetic product having a number average molecular weight of 800 and a degree of siloxane cross-linking of 1.5 as a multi-functional silicone cross-linked resin having a main chain formed by siloxane bonds were used, a deposited silver film having a cured coating of a first cured coating layer and a second cured coating layer was obtained in the same way as in Comparative Embodiment 1.

Comparative Embodiment 7

A coating agent was prepared by mixing 100 parts of Silacoat SCT-8101 (manufactured by Chisso Corporation) as the silicone acrylic resin (c1) component, 1.5 parts of a complex of zirconium with 4-methyl-γ-oxo-benzene-butanoic acid (CGCl 1930: manufactured by Ciba Specialty Chemicals K.K.) as the metal deactivator, 40 parts of xylene, 60 parts of isopropyl alcohol, and 50 parts of butyl acetate. Next, a deposited silver film was formed on a BMC sheet using a sputtering method. Then, a second cured coating layer (C) was formed by applying the coating agent to the surface of this deposited silver film using a spray method to give a coating thickness of 15 μm and then baking it at 200° C. for 60 minutes.

Comparative Embodiment 8

A coating agent was prepared by mixing 100 parts of Beckolite M-6652-60 (manufactured by Dainippon Ink and Chemicals, Inc.) as the silicone alkyd resin (c2) component, 50 parts of xylene, 50 parts of butyl acetate, and 5 parts of isopropyl alcohol. Next, a deposited silver film was formed on a BMC sheet using a sputtering method. Then, a second cured coating layer (C) was formed by applying the coating agent to the surface of this deposited silver film using a spray method to give a coating thickness of 10 μm and then baking it at 200° C. for 30 minutes.

Comparative Embodiment 9

A coating agent was prepared by mixing 100 parts of TSR144 (having a number average molecular weight of 650, and a degree of siloxane cross-linking of 1.3; manufactured by Toshiba silicone Co., Ltd.) as the mult-functional silicone cross-linked resin (c3) component having a main chain formed by siloxane bonds, 2 parts of tetra-n-butoxytitanium as the curing catalyst, 2 parts of a complex of zirconium with 4-methyl-γ-oxo-benzene-butanoic acid (manufactured by Ciba Specialty Chemicals K.K.) as the metal deactivator, 50 parts of xylene, 50 parts of butyl acetate, and 1 part of zinc octylate a the curing catalyst. Next, a deposited silver film was formed on a BMC sheet using a sputtering method. Then, a second cured coating layer (C) was formed by applying the coating agent to the surface of this deposited silver film using a spray method to give a coating thickness of 15 μm and then baking it at 200° C. for 60 minutes.

The properties of the samples were evaluated using the following tests. The results are shown in Table 2.

(1) Adhesion Test: Cuts were made so as to reach from the second cured coating layer (C) to the surface of the silver deposition layer in such a way as to form a grid of 100 squares having sides of 1.0 mm in length. Cellophane tape was then adhered well to the surface thereof, then the cellophane tape was peeled of with strong force, and the number of squares remaining counted.

(2) Heat Resistance Test: Samples were left for 200 hours in a Greer oven type furnace (manufactured by Satake Chemical Equipment MFG.: Ltd.) in atmospheres of 120, 180, and 210° C,. respectively. The discoloration (yellowing) condition, and adhesiveness of the second cured coating layer (C) were visually inspected and evaluated using a following four grades.

. . . absolutely no discoloration (yellowing) observed
. . . slight discoloration (yellowing) observed
. . . discoloration (yellowing) observed
. . . noticeable discoloration (yellowing) observed (3) Moisture Resistance Test: Samples were left for 300 hours in an air-conditioning equipment (manufactured by Takeda Research K.K.) at 40° C. and relative humidity of 95%, and then left at room temperature for 24 hours. The state of discoloration (corrosion) of the surface of deposited silver, and adhesiveness were evaluated using the following four grades.

. . . absolutely no discoloration (corrosion) observed
. . . slight discoloration (corrosion) observed
. . . discoloration (corrosion) observed
. . . noticeable discoloration (corrosion) observed (4) Hydrogen Sulfide Gas Resistance Test: Samples were left for 150 hours in a desiccator having an atmosphere of 25° C. and a hydrogen sulfide concentration adjusted to 20 ppm. The state of discoloration (corrosion) of the surface of the deposited silver and adhesiveness were evaluated in the same manner as above.

formed by siloxane bonds. This type of article having a silver layer is suitable for reflecting mirrors for indoor and

TABLE 1

| Item | Adhesiveness | Moisture Resistance | | Hydrogen Sulfide Gas Resistance | | Heat Resistance | | | | | |
|---|---|---|---|---|---|---|---|---|---|---|---|
| | | | | | | 120° C. | | 180° C. | | 210° C. | |
| | | External Appearance | Adhesiveness | External Appearance | Adhesiveness | External Appearance | Adhesiveness | External Appearance | Adhesiveness | External Appearance | Adhesiveness |
| Embodiments | | | | | | | | | | | |
| 1 | 100 | ⊚ | 100 | ⊚ | 100 | ⊚ | 100 | △ | 100 | × | 100 |
| 2 | 100 | ⊚ | 100 | ⊚ | 100 | ⊚ | 100 | △ | 100 | × | 100 |
| 3 | 100 | ⊚ | 100 | ⊚ | 100 | ⊚ | 100 | ○ | 100 | × | 100 |
| 4 | 100 | ○ | 100 | ○ | 100 | ⊚ | 100 | △ | 70 | × | 50 |
| 5 | 100 | ⊚ | 100 | ○ | 100 | ⊚ | 100 | ⊚ | 100 | × | 100 |
| 6 | 100 | ⊚ | 100 | ○ | 100 | ⊚ | 100 | ⊚ | 100 | × | 100 |
| 7 | 100 | ⊚ | 100 | ○ | 100 | ○ | 100 | ○ | 100 | × | 100 |
| 8 | 100 | ⊚ | 100 | ○ | 100 | ○ | 100 | ○ | 100 | × | 100 |
| 9 | 100 | ○ | 100 | ○ | 100 | ⊚ | 100 | ⊚ | 100 | ○ | 100 |
| 10 | 100 | ○ | 100 | ○ | 100 | ⊚ | 100 | ⊚ | 100 | ⊚ | 100 |
| 11 | 100 | ○ | 100 | ○ | 100 | ⊚ | 100 | ⊚ | 100 | ⊚ | 100 |
| 12 | 100 | ○ | 100 | ○ | 100 | ⊚ | 100 | ⊚ | 100 | ○ | 100 |
| 13 | 100 | ○ | 100 | ○ | 100 | ⊚ | 100 | ○ | 100 | ○ | 100 |
| 14 | 100 | ⊚ | 100 | ⊚ | 100 | ○ | 100 | ⊚ | 100 | ⊚ | 80 |
| 15 | 100 | ⊚ | 100 | ⊚ | 100 | ⊚ | 100 | ⊚ | 100 | ⊚ | 100 |

TABLE 2

| Item | Adhesiveness | Moisture Resistance | | Hydrogen Sulfide Gas Resistance | | Heat Resistance | | | | | |
|---|---|---|---|---|---|---|---|---|---|---|---|
| | | | | | | 120° C. | | 180° C. | | 210° C. | |
| | | External Appearance | Adhesiveness | External Appearance | Adhesiveness | External Appearance | Adhesiveness | External Appearance | Adhesiveness | External Appearance | Adhesiveness |
| Comparative Embodiments | | | | | | | | | | | |
| 1 | 60 | × | 50 | × | 50 | × | 40 | × | 30 | × | 20 |
| 2 | 100 | × | 100 | × | 100 | × | 100 | × | 100 | × | 100 |
| 3 | 40 | × | 10 | × | 40 | △ | 40 | × | 20 | × | 20 |
| 4 | 100 | × | 100 | × | 100 | × | 100 | × | 100 | × | 100 |
| 5 | 100 | ○ | 100 | ○ | 100 | × | 100 | × | 100 | × | 100 |
| 6 | 50 | ○ | 40 | × | 50 | × | 20 | × | 20 | × | 10 |
| 7 | 0 | × | 0 | × | 0 | × | 0 | × | 0 | × | 0 |
| 8 | 0 | × | 0 | × | 0 | × | 0 | × | 0 | × | 0 |
| 9 | 0 | × | 0 | × | 0 | × | 0 | × | 0 | × | 0 |

Industrial Applicability

As explained above, the article having a silver layer of the present invention has superior anti-discoloration (anti-corrosion) properties because it has a first cured coating layer (A) comprising a resin composition consisting principally of a resin having anti-corrosion properties for silver, and adhesiveness for both the substrate and silver or a metal comprising mainly silver formed between the substrate and the silver layer (B): and, formed on the silver layer (B), a second cured coating layer (C) having heat resistance and transparency and comprising a resin composition comprising as a principal component at least one type of resin selected from the group consisting of silicone acrylic resin (c1), a silicone alkyd resin (c2), and a multi-functional silicone cross-linked resin (c3) having an average compositional formula represented by general formula 1, a number average molecular weight of 500~1000, and a main chain formed by siloxane bonds. This type of article having a silver layer is suitable for reflecting mirrors for indoor and outdoor lighting appliances, reflecting mirrors for automobile headlights, and the like.

In addition, since the resin composition for coating material for silver of the present invention contains a multi-functional silicone cross-linked resin (c3) having an average compositional formula represented by general formula 1, a number average molecular weight of 500~1000, and a main chain formed by siloxane bonds, it has superior heat-resistance, it gives a superior anti-discoloration (anti-corrosion) property to silver and a film thereof does not turn yellow even when exposed to high temperatures of around 200° C. This type of resin composition for coating materials for silver is suitable as a coating film for covering silver used in reflecting mirrors of indoor and outdoor lighting appliances, reflecting mirrors for automobile headlights, and the like.

What is claimed is:

1. An article having a silver layer comprising:
a first cured coating layer (A) comprising a resin composition in which a resin having anti-corrosion properties for silver and adhesiveness for both a substrate and silver, or a metal comprising silver as a principle component, formed on the surface of the substrate;
a silver (B) comprising silver, or a metal comprising silver as a principal component, formed on said first cured coating layer (A); and
a second cured coating layer (C) formed on said silver layer (B), having heat resistance and transparency and comprising a resin composition comprising a metal deactivator and as a principal component at least one type of resin selected from the group consisting of
a silicone acrylic resin (c1),
a silicone alkyd resin (c2), and
a multi-functional silicone cross-linked resin (c3) having an average compositional formula represented by general formula 1, a number average molecular weight of 500~1000, and a main chain formed by siloxane bonds, $$R_n SiO_{(4-n)/2} \quad (1)$$

(in the formula, R is a hydrogen atom, a lower alkyl group, a phenyl group, or a substituted phenyl group; and n is a number from 1.2 to 1.4).

2. An article having a silver layer according to claim 1 wherein a resin which forms said first cured layer (A) is a resin of at least one type selected from the group consisting of a silicone acrylic resin (c1), a silicone alkyd resin (c2), and a multi-functional silicone cross-linked resin (c3) having an average compositional formula represented by said general formula 1, a number average molecular weight of 500~1000, and a main chain formed by siloxane bonds.

3. An article having a silver layer according to claim 1 wherein a resin forming said second cured coating layer (C) is a multi-functional silicone cross-linked resin (c3) having an average compositional formula represented by said general formula 1, a number average molecular weight of 500~1000, and a main chain formed by siloxane bonds.

4. An article having a silver layer according to claim 1 wherein the substrate is metal or synthetic resin.

5. An article having a silver layer according to claim 1 wherein a silver layer (B) is a thin layer of silver or mainly silver formed by a vacuum deposition method an ion plating method, or a sputtering method.

6. An article having a silver layer according to one of claims 1 to 5, comprising a specular glossy surface or reflective surface.

7. An article having a silver layer according to claim 1 being a reflective mirror for indoor or outdoor lighting appliances or a reflective mirror for automobile headlights.

* * * * *